United States Patent
Todoriki et al.

[11] Patent Number: 5,870,424
[45] Date of Patent: Feb. 9, 1999

[54] GRAPHITE ELECTRODE HAVING JOINTS

[75] Inventors: Masao Todoriki; Takayuki Fukai; Yoshishige Sekiguchi; Osamu Kanazawa, all of Nagano; Hiroyuki Yamashita, Kagawa, all of Japan

[73] Assignee: Showa Denko Kabushikikaisha, Tokyo, Japan

[21] Appl. No.: 667,797

[22] Filed: Jun. 20, 1996

[30] Foreign Application Priority Data

Jun. 21, 1995 [JP] Japan ................................. 7-178085

[51] Int. Cl.$^6$ ....................................... H05B 7/14
[52] U.S. Cl. ............................................ 373/92; 373/91
[58] Field of Search ................... 373/88, 91, 92, 373/93

[56] References Cited

U.S. PATENT DOCUMENTS

| | | | |
|---|---|---|---|
| 2,810,117 | 10/1957 | Abbott | 373/92 |
| 2,828,162 | 3/1958 | Johnson et al. | 373/92 |
| 3,072,558 | 1/1963 | Myers et al. | 373/92 |
| 3,173,714 | 3/1965 | Whitwell | 373/92 |
| 3,517,957 | 6/1970 | Vail et al. | 373/92 |
| 4,691,324 | 9/1987 | Kraus | 373/91 |
| 4,703,492 | 10/1987 | Sekiguchi et al. | 373/91 |
| 4,998,709 | 3/1991 | Griffin et al. | 264/29.5 |

*Primary Examiner*—Tu Ba Hoang
*Attorney, Agent, or Firm*—Armstrong, Westerman, Hattori, McLeland & Naughton

[57] ABSTRACT

In order to prevent the rupturing of a graphite electrode comprising electrode sections joined with one another by a socket and a nipple, electrical insulating material is applied on the joined surfaces to decrease the current across the nipple.

13 Claims, 5 Drawing Sheets

Fig. 2
PRIOR ART
Fig. 3
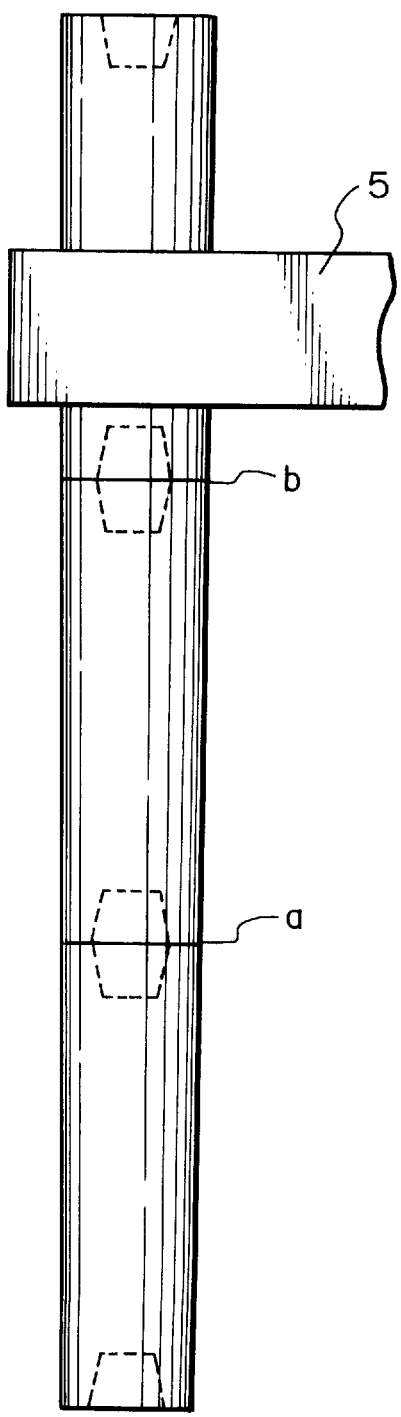
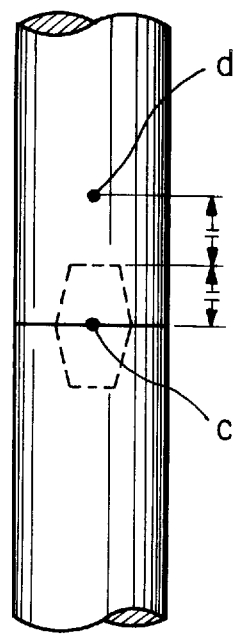

GRAPHITE ELECTRODE HAVING JOINTS

BACKGROUND OF INVENTION

1. Field of Invention

The present invention relates to a graphite electrode having joints, used for a steelmaking electric furnace. More particularly, the present invention relates to a graphite electrode, in which current conduction through a joint of the electrode sections is decreased to suppress the heat generation at the joint and hence to prevent a nipple from rupturing.

2. Description of Related Arts

In order to join the graphite-electrode sections used for an electric furnace, a nipple with grooved screw is generally used. This nipple 3 is screwed into the socket 4 of the graphite-electrode sections 1 and 2, as is shown in FIG. 1.

Along with advancement of high-load operation of steelmaking electric furnaces, the graphite electrode and its joint parts are exposed to high electric and mechanical load. Rupturing of the graphite electrode, which may be hereinafter simply referred to as an electrode, therefore occurs frequently, mostly in the joints.

As is known, the temperature of the central portion of an electrode becomes higher in recent direct-current electric steelmaking furnaces than in conventional alternating-current electric steelmaking furnaces. The nipple, which is located in the central portion of an electrode, is therefore exposed to a high temperature, with the result that the rupture is likely to occur.

It is now described how the rupturing occurs with reference to FIG. 2 which illustrates jointed electrode-sections. In FIG. 2, the three electrode sections are joined at the joints "a" and "b" and are integrally suspended by the holder arm 5. As compared with joint "a", joint "b" is subjected to higher mechanical load of the electrode-sections and to higher lateral mechanical load due to raw materials and the like, which strike the tip end of the electrode and generate the bending moment. Although these loads are high at joint "a", the ruptures overwhelmingly much occur in the nipple of joint "a". In addition, no matter how the outer circumferential surface of an electrode wears due to oxidation and is hence weakened, the rupture occurs not in the electrode sections but in the nipple. It seems therefore that a major reason of the rupture lies in thermal load rather than the mechanical load.

It has been heretofore proposed to prevent the joint portion of an electrode from rupturing, by means of modifying the shape of the nipple and screw so as to mitigate the stress concentration on these parts, as seen in Japanese Examined Utility Model Publications No. 57-45,676 and No. 58-958, by means of sandwiching conductive material between the bottom of the socket and the end of the nipple so as to prevent the generation of local current (Japanese Examined Utility Model Publication No. 63-36,639), or by means of modifying the structure of the nipple so as to easily absorb its thermal expansion (Japanese Examined Utility Model Publication No. 59-1,357).

The previous measures for preventing the electrode from rupturing lie in variously modifying the nipple shape or sandwiching the conductive material as described above, but do not intend to decrease the current passing across the nipple. Since the temperature of a nipple is particularly high in the direct-current electric furnace at present, the known methods cannot attain a satisfactory result.

In the direct-current electric furnace with, for example a 30 inch electrode, the current across the nipple and the current across the contact part between the electrode sections is allegedly 50% each, based on the area ratio of the former and latter. However, since the nipple is screwed into and fastened by the socket, the density of the nipple is increased resulting in the decrease of resistivity. The current is therefore more liable to conduct through the nipple than the contact part between the electrode sections.

SUMMARY OF THE INVENTION

It is an object of the present invention to provide a novel graphite-electrode, the rupture of whose joints are prevented by decreasing the current flowing through the nipple and hence suppressing its overheating.

The present inventors elucidated the cause of the rupturing of a graphite electrode, made various studies, and took pertinent countermeasures. The present inventors then discovered that the current conduction through the joints of an electrode is not hindered at all even by means of suppressing the current conducted through a nipple.

The present invention thus completed results in a graphite electrode comprising the electrode sections which are joined with one another by a socket and a nipple, characterized in that electrical insulating material is present on the joined surfaces, thereby decreasing the current across the nipple.

The graphite electrode according to the present invention comprises:

electrode sections to be axially joined with one another at each end;

a socket in the form of a female screw, formed at said end, axially extending into the body of the electrode section and having a screw surface thereon;

a nipple in the form of a male screw, to be screwed into the socket of a pair of the electrode sections and having a screw surface; and, an electrical insulating material present between the screw surfaces of the nipple and the sockets.

The electrical insulating material may be any of various materials having insulating property and heat resistance at 500° C. or more. Particularly, BN, $Ca(OH)_2$, $Al_2O_3$, $SiO_2$ and the like in the form of powder are suitable. Among them, hexagonal BN exhibits a lubricating property, and the nipple can be joined smoothly to the socket when hexagonal BN is applied on the screw surface of a nipple or socket. The hexagonal BN also has high electrical insulating property and heat resistance, and is therefore most preferred.

The present invention is described in more detail with reference to the drawings.

BRIEF DESCRIPTION OF THE DRAWINGS

FIG. 2 is a drawing generally illustrating a graphite electrode rigidly joined by nipples.

FIG. 3 is a drawing generally illustrating the position of temperature-measurement at the joined portions between a graphite electrode and a nipple.

DETAILED DESCRIPTION OF THE INVENTION

Figure 1:
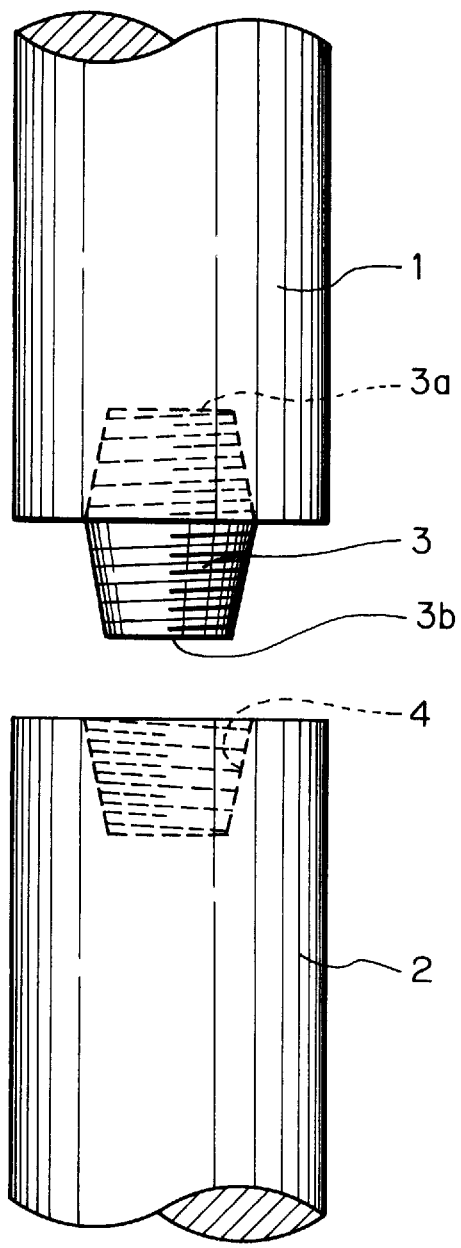
FIG. 1 is a drawing generally illustrating the joint parts of a graphite electrode and a nipple.

Electrical insulating material 6 is applied on either the screw surface of a nipple 3 or the screw surface of a socket 4 or on both surfaces. This can be in the form of a powder suspended in water or an organic solvent. The resultant suspension can be easily applied on the surface(s) mentioned above by means of spraying or brush. A surface-active agent is preferably added to the water. Methyl ethyl ketone and dimethyl ether can be used preferably as the organic solvent. The electrical insulating material 6 may not be applied on the top surface 3a or the bottom surface 3b of a nipple, because a clearance is usually formed between these surfaces 3a and 3b and the joined electrode sections 1 and 2, so that no current is conducted through the joined electrode sections 1 and 2. The appropriate thickness of the electrical insulating material is usually from 1 to 10 $\mu$m, although appropriate thickness should be determined after confirmation that absolutely no obstruction in the current conduction results from the application of the insulating material. In this regard, note that extremely high insulation between the nipple 3 and socket 4 would result in such obstruction in the current conduction that the operation of the electric steelmaking furnace would become difficult. Preferably, the voltage between the top and bottom of the electrode is not essentially changed, but the temperature at the center of the nipple decreases by from 20° to 200° C. by the application of electrical insulating material.

The electrical insulating material is preferably applied on the entire surface of the nipple 3 and/or socket 4 including the top 3a and bottom 3b. The electrical insulating material may however be applied on either upper or lower surface of the nipple 3 and/or socket 4.

The present invention is hereinafter described with an example and a comparative example.

EXAMPLE 1

6-inch electrode sections 60 inches in length as stipulated by JIS (Japanese Industrial Standard) were used for a laboratory experiment. Lime was applied on the entire screw surfaces of a nipple. For the application, slaked lime dispersed in water was sprayed. The application amount was 3 g of the slaked lime per nipple. After applying, the nipple was dried at 20° C. The 6 inch electrode sections were joined as shown in FIG. 3 by means of the nipple 2. Alternating current was conducted from one end to the other end of the electrode at a current density of 37.6 A/cm$^2$ and a voltage of 36.0V.

For the purpose of comparison, the same alternating current as above was conducted through the above mentioned electrode, except that there was no application of the lime. Note, that the voltage in the comparative example was 36.0V notwithstanding keeping the current density identical.

Figure 4:
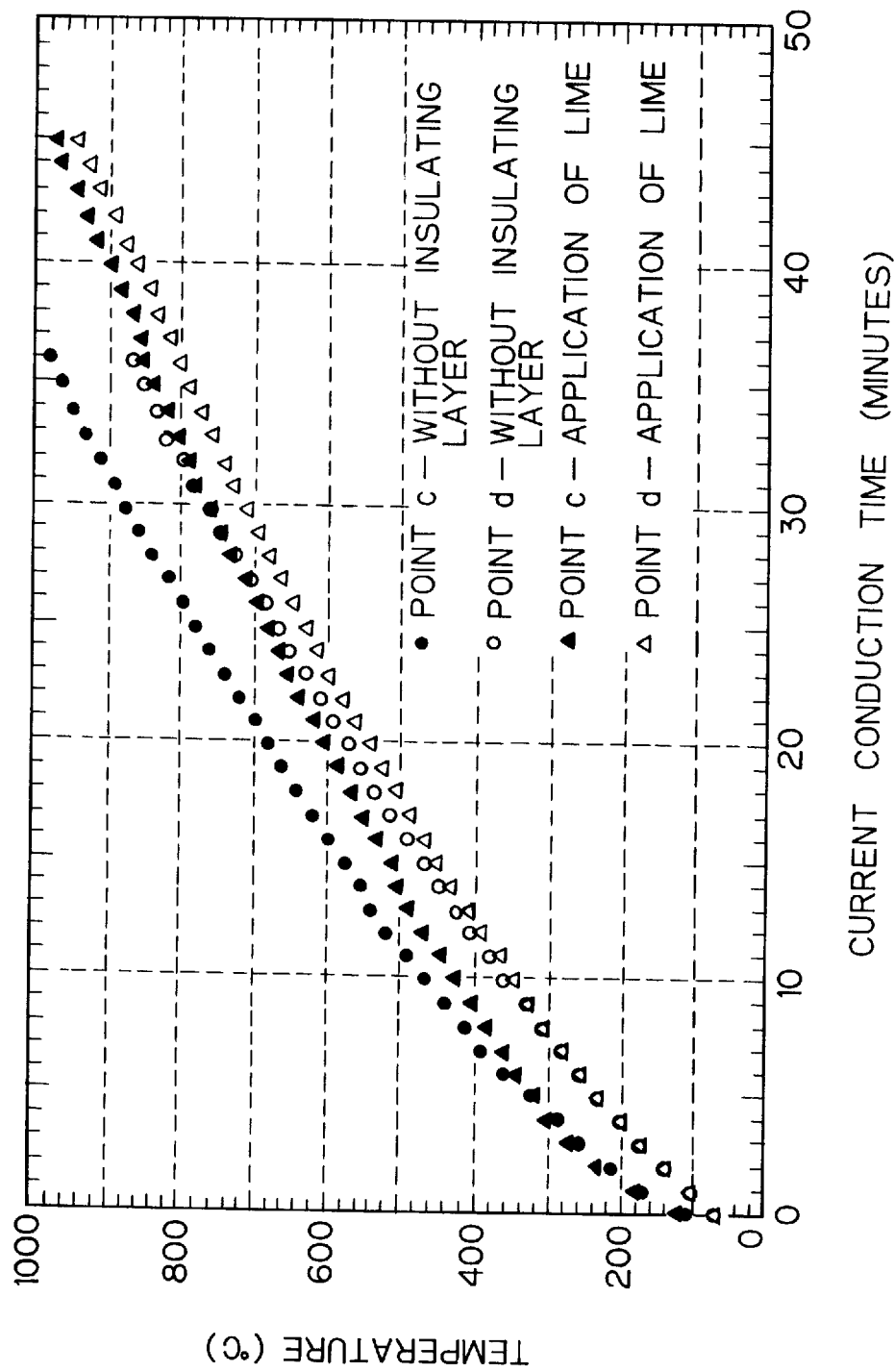
FIG. 4 is a graph showing the relationship between the current conduction time and the temperature.
Figure 5:
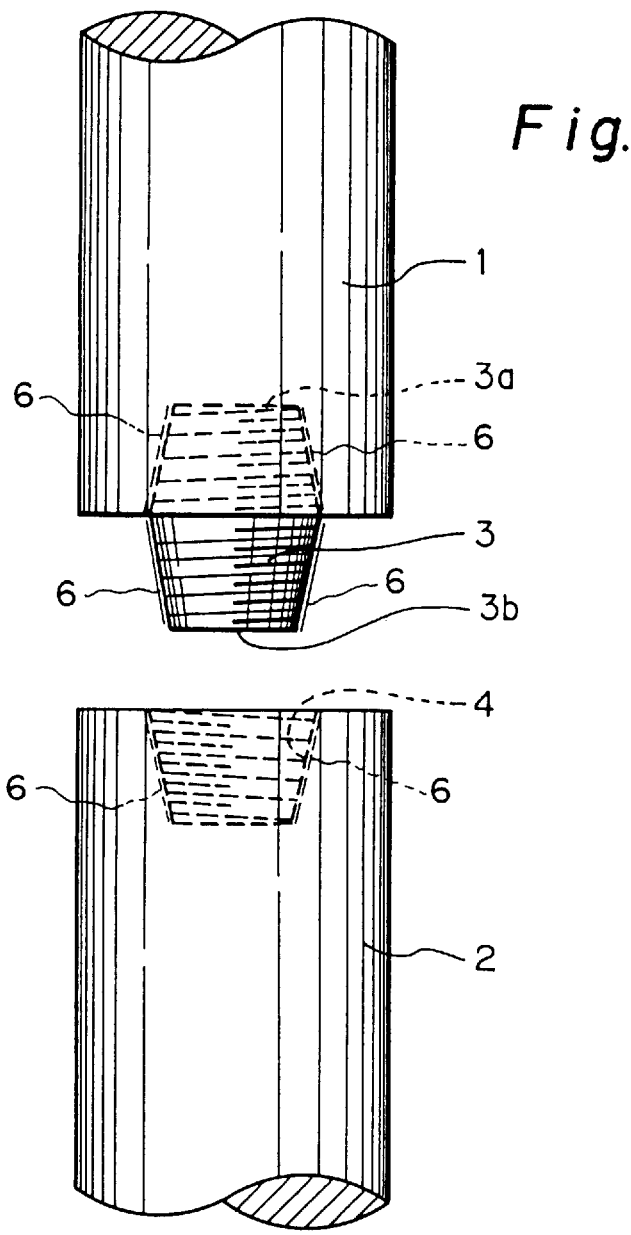
FIG. 5 is a front view of a first embodiment of the present invention, wherein an electrical insulating material is applied to any one of the screw surface of the nipple, the screw surface of the socket, and both screw surfaces of the nipple and socket, but not on the top or bottom surface of the nipple or the socket.
Figure 6:
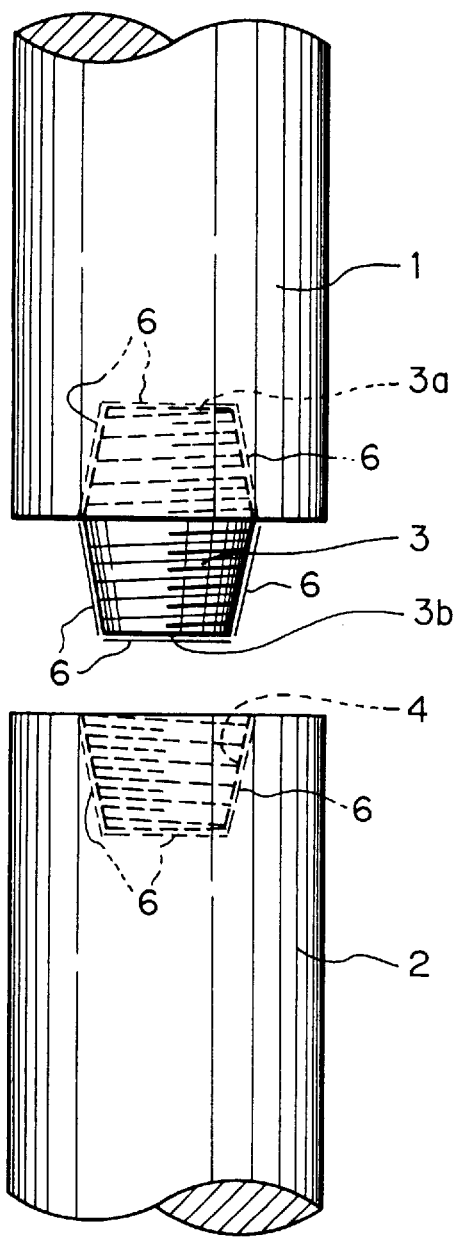
FIG. 6 is a front view of a second embodiment of the present invention, wherein an electrical insulating material is applied to any one of the screw surface of the nipple, the screw surface of the socket, and both screw surfaces of the nipple and socket, and the electrical insulating material is also applied to the top and bottom surfaces of the nipple and socket.

During the current conduction, the temperature was measured by means of a thermo-couple located at the central point of the nipple "c" and another thermo-couple located at point "d" located at a distance equal to the length of a nipple from point "C", as shown in FIG. 3. The results are shown in FIG. 4.

The voltage was virtually unenhanced by the application of the electrical insulating material, and, therefore no obstruction in the current conduction resulted. The temperatures measured in the nipple center "c" and the electrode center "d" were lower in the case of the lime application on the nipple than in the case of no application. Furthermore, the temperature difference between the points "d" and "c" is less in the case of the lime application on the nipple than in the case of no application. It seems that the temperatures at the points "d" and "c" decrease and the surface temperature rises by the application of lime.

EXAMPLE 2

Experiments using an actual furnace was carried out in Okayama Plant of Tokyo Steel Mfg. Co., Ltd. The furnace used was direct-current steelmaking electric furnace, with a graphite electrode 30 inches in diameter and 110 inches in length. Hexagonal boron nitride (BN) powder was dispersed in the mixed solvent of methyl ethyl ketone and dimethyl ether. The content of the boron nitride was 2.6% by weight. The boron nitride dispersion was applied by spraying on the lower half of each nipple. The boron nitride applied per nipple was approximately 1 g. Sixty two nipples in total were tested. In the twenty nine nipples, the boron nitride was applied on only the nipple, while in the remaining thirty three nipples the same amount of boron nitride was applied on both nipple and the lower socket to be joined with the lower half of the nipple.

For the purpose of comparison, no boron nitride was applied on the nipple in 34 cases.

The operation conditions of the electric furnace were kept constant for every case of the boron-nitride application and those with no application. The results are shown in the following table.

TABLE 1

|  | Ruptured Number of Nipples/Used Number of Nipples | Rupturing Ratio (%) |
| --- | --- | --- |
| No Application of BN | 13/34 | 38.2 |
| Application of BN only on the lower surface of a nipple | 2/29 | 6.9 |
| Application of BN on both the lower surface of a nipple and lower socket | 0/33 | 0 |

In these tests, every rupture occurred at the joint part "a" shown in FIG. 2.

As is described herein above, the rupturing of nipples can be drastically decreased. This is believed to be due to keeping improved contact between the nipple and electrode sections, which is attained by controlling the current conduction through them and thus decreasing temperature difference between them. Heretofore, the socket frequently cracked at the bottom electrode section and hence it fell off. Such accidents could also be prevented by decreasing the temperature difference. The present invention therefore has great practical advantages.

We claim:

1. A graphite electrode, used in a steelmaking furnace, comprising:

a socket;

a nipple;

electrical insulating material;

electrode sections joined with one another by said socket and said nipple to form joined surfaces, wherein said electrical insulating material is present on said joined surfaces, thereby decreasing a current across said nipple and wherein said electrode sections are axially joined to one another at first ends thereof;

wherein said socket is formed to extend axially through said first end of one of said electrode sections and has female screws in an outer periphery thereof; and wherein said nipple extends axially outwardly from said first end of another of said electrode sections so that said outer periphery of said nipple has male screws thereon to mate with said female screws of said socket.

2. The graphite electrode according to claim 1, wherein said electrical insulating material is BN.

3. The graphite electrode according to claim 2, wherein said electrical insulating material is hexagonal BN.

4. The graphite electrode according to claim 1, wherein said electrical insulating material is applied on any one of said male screws of said nipple and said female screws of said socket.

5. The graphite electrode according to claim 1, wherein said electrical insulating material is applied on both said male screws of said nipple and said female screws of said socket.

6. The graphite electrode according to claim 4, wherein said electrical insulating material is suspended in a solvent and is applied on any one of said male screws of said nipple and said female screws of said socket.

7. The graphite electrode according to claim 6, wherein said electrical insulating material is applied on any one of said male screws of said nipple and said female screws of said socket in an amount such that a voltage between a top and a bottom of said graphite electrode is not essentially decreased, but said temperature at said center of said nipple decreases from 20° to 200° C.

8. The graphite electrode according to claim 4, wherein said electrical insulating material is applied on any one of a lower half surface of any one of said nipple and said socket and any one of a upper half surface of said nipple and said socket.

9. The graphite electrode according to claim 5, wherein said electrical insulating material is applied on any one of a lower half surface of any one of said nipple and said socket and any one of a upper half surface of said nipple and said socket.

10. The graphite electrode according to claim 8, wherein said electrical insulating material is applied on any one of said male screws of said nipple, said female screws of said socket, and both said male screws of said nipple and said female screws of said socket in an amount such that a voltage between a top and a bottom of said graphite electrode is not essentially decreased, but said temperature at said center of said nipple decreases from 20° to 200° C.

11. The graphite electrode according to claim 9, wherein said electrical insulating material is applied on any one of said male screws of said nipple, said female screws of said socket, and both said male screws of said nipple and said female screws of said socket in an amount such that a voltage between a top and a bottom of said graphite electrode is not essentially decreased, but said temperature at said center of said nipple decreases from 20° to 200° C.

12. The graphite electrode according to claim 5, wherein said electrical insulating material is suspended in a solvent and is applied on any one of said male screws of said nipple and said female screws of said socket.

13. The graphite electrode according to claim 12, wherein said electrical insulating material is applied on any one of said male screws of said nipple and said female screws of said socket in an amount such that a voltage between a top and a bottom of said graphite electrode is not essentially decreased, but said temperature at said center of said nipple decreases from 20° to 200° C.

* * * * *